United States Patent
Mami et al.

(10) Patent No.: US 7,539,617 B2
(45) Date of Patent: May 26, 2009

(54) METHOD AND SYSTEM FOR ANALYSIS OF VOCAL SIGNALS FOR A COMPRESSED REPRESENTATION OF SPEAKERS USING A PROBABILITY DENSITY REPRESENTING RESEMBLANCES BETWEEN A VOCAL REPRESENTATION OF THE SPEAKER IN A PREDETERMINED MODEL AND A PREDETERMINED SET OF VOCAL REPRESENTATIONS REFERENCE SPEAKERS

(75) Inventors: Yassine Mami, Lannion (FR); Delphine Charlet, Lannion (FR)

(73) Assignee: France Telecom, Paris (FR)

( * ) Notice: Subject to any disclaimer, the term of this patent is extended or adjusted under 35 U.S.C. 154(b) by 80 days.

(21) Appl. No.: 10/563,065

(22) PCT Filed: Jul. 1, 2003

(86) PCT No.: PCT/FR03/02037

§ 371 (c)(1),
(2), (4) Date: Jul. 10, 2006

(87) PCT Pub. No.: WO2005/015547

PCT Pub. Date: Feb. 17, 2005

(65) Prior Publication Data

US 2006/0253284 A1    Nov. 9, 2006

(51) Int. Cl.
*G10L 15/14*    (2006.01)

(52) U.S. Cl. .................................................... 704/256

(58) Field of Classification Search ................. 704/250, 704/256–256.8
See application file for complete search history.

(56) References Cited

U.S. PATENT DOCUMENTS

| | | | | |
|---|---|---|---|---|
| 5,664,059 | A * | 9/1997 | Zhao ........................... | 704/254 |
| 5,675,704 | A * | 10/1997 | Juang et al. ................. | 704/246 |
| 5,790,758 | A * | 8/1998 | Streit ........................... | 706/33 |
| 5,793,891 | A * | 8/1998 | Takahashi et al. ........... | 382/228 |
| 5,835,890 | A * | 11/1998 | Matsui et al. ............... | 704/255 |
| 5,864,810 | A * | 1/1999 | Digalakis et al. ............ | 704/255 |
| 5,946,656 | A * | 8/1999 | Rahim et al. ............. | 704/256.2 |
| 6,009,390 | A * | 12/1999 | Gupta et al. ................ | 704/240 |
| 6,029,124 | A * | 2/2000 | Gillick et al. ............... | 704/200 |
| 6,212,498 | B1 * | 4/2001 | Sherwood et al. ........... | 704/244 |
| 6,411,930 | B1 * | 6/2002 | Burges ........................ | 704/240 |
| 6,697,778 | B1 * | 2/2004 | Kuhn et al. .................. | 704/243 |
| 6,754,628 | B1 * | 6/2004 | Chaudhari et al. .......... | 704/246 |

OTHER PUBLICATIONS

International Search Report dated Mar. 25, 2004 for corresponding PCT Application No. PCT/FR03/020237 (3 pgs).
Sturim, et al. "Speaker Indexing In Large Audio Database Using Anchor Models", IEEE 2001, pp. 429-432 (4 pgs).
Reynolds "Speaker Identification And Verification Using Gaussian Mixture Speaker Models", Speech Communication 17, 1995, p. 91-108 (18 pgs).
International Search Report (French and English) (6 pgs).

* cited by examiner

*Primary Examiner*—Michael N Opsasnick
(74) *Attorney, Agent, or Firm*—Drinker Biddle & Reath LLP

(57) ABSTRACT

For analyzing vocal signals of a speaker, a probability density representing resemblances between a vocal representation of the speaker in a predetermined model and a predetermined set of vocal representations of a number E of reference speakers in said predetermined model is used. The probability density is analyzed so as to deduce information on the vocal signals.

9 Claims, 2 Drawing Sheets

ND AND SYSTEM FOR ANALYSIS OF
VOCAL SIGNALS FOR A COMPRESSED
REPRESENTATION OF SPEAKERS USING A
PROBABILITY DENSITY REPRESENTING
RESEMBLANCES BETWEEN A VOCAL
REPRESENTATION OF THE SPEAKER IN A
PREDETERMINED MODEL AND A
PREDETERMINED SET OF VOCAL
REPRESENTATIONS REFERENCE
SPEAKERS

RELATED APPLICATIONS

The subject application is a U.S. National Stage application that claims the priority of International Application No. PCT/FR2003/002037, filed on 01 Jul. 2003.

FIELD OF THE INVENTION

The present invention relates to a method and a device for analyzing vocal signals.

BACKGROUND

The analysis of vocal signals requires in particular the ability to represent a speaker. The representation of a speaker by a mixture of Gaussians ("Gaussian Mixture Model" or GMM) is an effective representation of the acoustic or vocal identity of a speaker. According to this technique, the speaker is represented, in an acoustic reference space of a predetermined dimension, by a weighted sum of a predetermined number of Gaussians.

This type of representation is accurate when a large amount of data is available, and when there are no physical constraints in respect of the storage of the parameters of the model, or in respect of the execution of the calculations on these numerous parameters.

Now, in practice, to represent a speaker within IT systems, it transpires that the time for which a speaker is talking is short, and that the size of the memory required for these representations, as well as the times for calculations with regard to these parameters are too big.

It is therefore important to seek to represent a speaker in such a way as to drastically reduce the number of parameters required for the representation thereof while maintaining correct performance. Performance is meant as the error rate of vocal sequences that are not recognized as belonging or not to a speaker with respect to the total number of vocal sequences.

Solutions in this regard have been proposed, in particular in the document "SPEAKER INDEXING IN LARGE AUDIO DATABASES USING ANCHOR MODELS" by D. E. Sturim, D. A. Reynolds, E. Singer and J. P. Campbell. Specifically, the authors propose that a speaker be represented not in an absolute manner in an acoustic reference space, but instead in a relative manner with respect to a predetermined set of representations of reference speakers also called anchor models, for which GMM-UBM models are available (UBM standing for "Universal Background Model"). The proximity between a speaker and the reference speakers is evaluated by means of a Euclidean distance. This enormously decreases the calculational load, but the performance is still limited and inadequate.

SUMMARY

In view of the foregoing, an object of the invention is to analyze vocal signals by representing the speakers with respect to a predetermined set of reference speakers, with a reduced number of parameters decreasing the calculational load for real-time applications, with acceptable performance, by comparison with analysis using a representation by the GMM-UBM model.

It is then for example possible to perform indexings of audio documents of large databases where the speaker is the indexing key.

Thus, according to an aspect of the invention, there is proposed a method of analyzing vocal signals of a speaker ($\lambda$), using a probability density representing the resemblances between a vocal representation of the speaker ($\lambda$) in a predetermined model and a predetermined set of vocal representations of a number E of reference speakers in said predetermined model, and the probability density is analyzed so as to deduce therefrom information on the vocal signals.

This makes it possible to drastically decrease the number of parameters used, and allows devices implementing this method to be able to work in real time, while decreasing the calculation time, while decreasing the size of the memory required.

In a preferred embodiment, an absolute model (GMM), of dimension D, using a mixture of M Gaussians, is taken as predetermined model, for which the speaker ($\lambda$) is represented by a set of parameters comprising weighting coefficients ($\alpha_i$, i=1 to M) for the mixture of Gaussians in said absolute model (GMM), mean vectors ($\mu_i$, i=1 to M) of dimension D and covariance matrices ($\Sigma_i$, i=1 to M) of dimension D×D.

In an advantageous embodiment, the probability density of the resemblances between the representation of said vocal signals of the speaker ($\lambda$) and the predetermined set of vocal representations of the reference speakers is represented by a Gaussian distribution ($\psi(\mu^\lambda, \Sigma^\lambda)$) of mean vector ($\mu^\lambda$) of dimension E and of covariance matrix ($\Sigma^\lambda$) of dimension E×E which are estimated in the space of resemblances to the predetermined set of E reference speakers.

In a preferred embodiment, the resemblance ($\psi(\mu^\lambda, \Sigma^\lambda)$) of the speaker ($\lambda$) with respect to the E reference speakers is defined, for which speaker ($\lambda$) there are $N_\lambda$ segments of vocal signals represented by $N_\lambda$ vectors of the space of resemblances with respect to the predetermined set of E reference speakers, as a function of a mean vector ($\mu^\lambda$) of dimension E and of a covariance matrix ($\Sigma^\lambda$) of the resemblances of the speaker ($\lambda$) with respect to the E reference speakers.

In an advantageous embodiment, a priori information is moreover introduced into the probability densities of the resemblances ($\psi(\tilde{\mu}^\lambda, \tilde{\Sigma}^\lambda)$) with respect to the E reference speakers.

In a preferred embodiment, the covariance matrix of the speaker ($\lambda$) is independent of said speaker ($\tilde{\Sigma}^\lambda = \tilde{\Sigma}$).

According to another aspect of the invention, there is proposed a system for the analysis of vocal signals of a speaker ($\lambda$), comprising databases in which are stored vocal signals of a predetermined set of E reference speakers and their associated vocal representations in a predetermined model, as well as databases of audio archives, characterized in that it comprises means of analysis of the vocal signals using a vector representation of the resemblances between the vocal representation of the speaker and the predetermined set of vocal representations of E reference speakers.

In an advantageous embodiment, the databases also store the vocal signals analysis performed by said means of analysis.

The invention may be applied to the indexing of audio documents, however other applications may also be envisaged, such as the acoustic identification of a speaker or the verification of the identity of a speaker.

BRIEF DESCRIPTION OF THE DRAWINGS

The invention is explained with regard to various embodiments presented in the drawing and in the following descriptive text.

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION OF THE PREFERRED EMBODIMENTS

Figure 1:
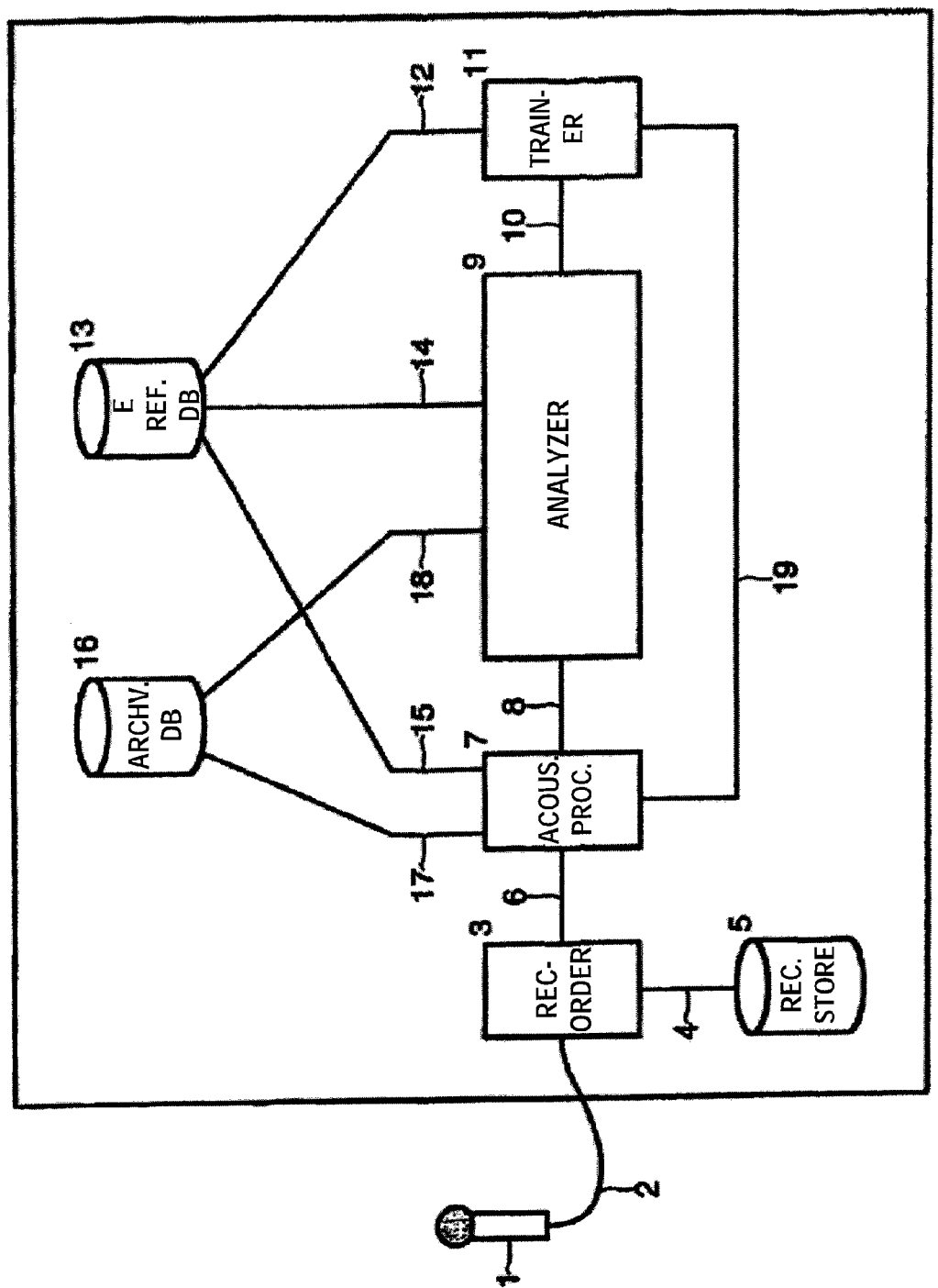
FIG. 1 is a block diagram illustrating an embodiment of the components in the system.
Figure 2:
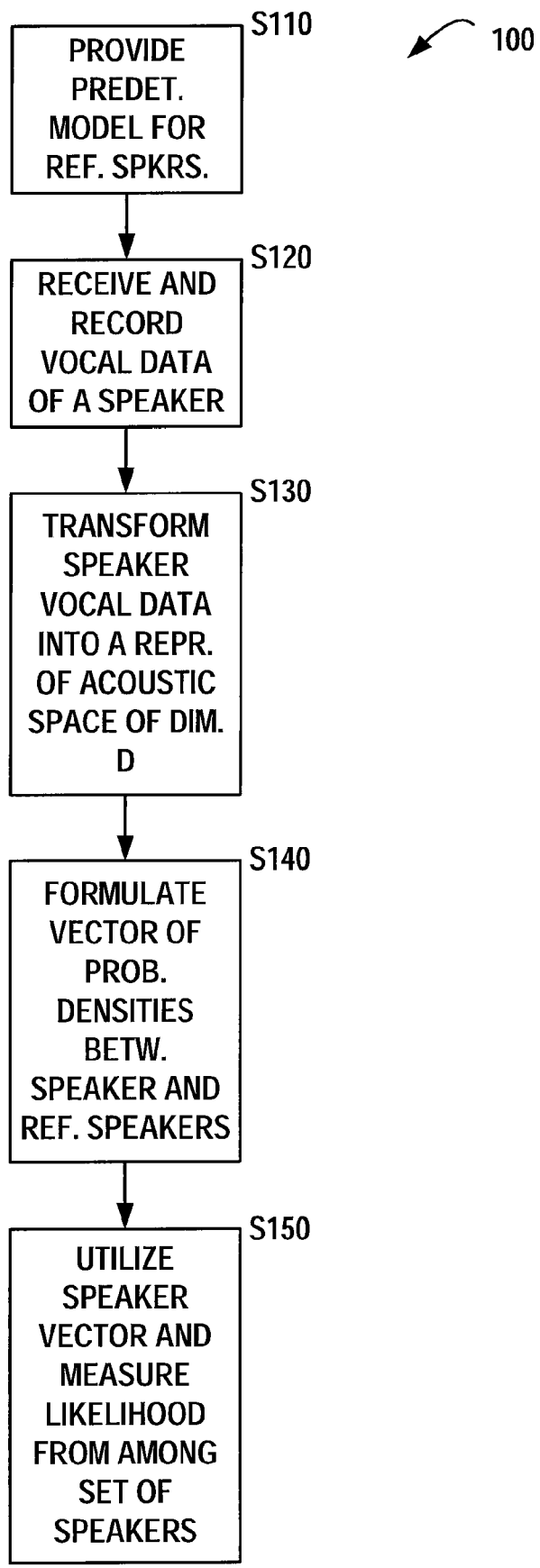
FIG. 2 is a flowchart illustrating an embodiment of the inventive method.

FIGS. 1 and 2 represent an application of the system and method according to an aspect of the invention in respect of the indexing of audio databases. Of course, the invention applies also to the acoustic identification of a speaker or the verification of the identity of a speaker, that is to say, in a general manner, to the recognition of information relating to the speaker in the acoustic signal. The system comprises a means for receiving vocal data of a speaker (S120), for example a mike 1, linked by a wire or wireless connection 2 to means of recording 3 (S120) of a request enunciated by a speaker λ and comprising a set of vocal signals. The recording means 3 are linked by a connection 4 to storage means 5 and, by a connection 6, to means of acoustic processing 7 of the request. These acoustic means of processing transform (S130) the vocal signals of the speaker 2 into a representation in an acoustic space of dimension D by a GMM model for representing the speaker λ.

This representation is defined by a weighted sum of M Gaussians according to the equations:

$$\begin{cases} p(x|\lambda) = \sum_{i=1}^{M} \alpha_i b_i(x) & (1) \\ b_i(x) = \frac{1}{(2\pi)^{D/2} \cdot |\Sigma_i|^{1/2}} \times \exp\left[-\frac{1}{2}{}^t(x-\mu_i)\sum_i^{-1}(x-\mu_i)\right] & (2) \\ \sum_{i=1}^{M} \alpha_i = 1 & (3) \end{cases}$$

in which:

D is the dimension of the acoustic space of the absolute GMM model;

x is an acoustic vector of dimension D, i.e. vector of the cepstral coefficients of a vocal signal sequence of the speaker λ in the absolute GMM model;

M denotes the number of Gaussians of the absolute GMM model, generally a power of 2 lying between 16 and 1024;

$b_i(x)$ denotes, for i=1 to D, Gaussian densities, parameterized by a mean vector $\mu_i$ of dimension D and a covariance matrix $\Sigma_i$ of dimension D×D; and $\alpha_i$ denotes, for i=1 to D, the weighting coefficients of the mixture of Gaussians in the absolute GMM model.

The means of acoustic processing 7 of the request are linked by a connection 8 to means of analysis 9. These means of analysis 9 are able to represent (S140) a speaker by a probability density vector representing the resemblances between the vocal representation of said speaker in the GMM model chosen and vocal representations of E reference speakers in the GMM model chosen. The means of analysis 9 are furthermore able to perform tests (S150) for verifying and/or identifying a speaker.

To carry out these tests, the analysis means undertake the formulation of the vector of probability densities, that is to say of resemblances between the speaker and the reference speakers.

This entails describing a relevant representation of a single segment x of the signal of the speaker λ by means of the following equations:

$$\begin{cases} w^\lambda = \begin{pmatrix} \tilde{p}(x^\lambda|\overline{\lambda}_1) \\ \vdots \\ \tilde{p}(x^\lambda|\overline{\lambda}_E) \end{pmatrix} & (4) \\ \tilde{p}(x^\lambda|\overline{\lambda}_j) = \frac{1}{T_x}\log\left(\frac{p(x^\lambda|\overline{\lambda}_j)}{p(x^\lambda|\overline{\lambda}_{UBM})}\right) & (5) \\ p(x|\overline{\lambda}) = \sum_{k=1}^{M} \alpha_k b_k(x) \text{ where } \sum_{k=1}^{M} \alpha_k = 1 & (6) \\ b_k(x) = \frac{1}{(2\pi)^{D/2}|\Sigma_k|^{1/2}} \times \exp\left[-\frac{1}{2}{}^t(x-\mu_k)(\sum_k)^{-1}(x-\mu_k)\right] & (7) \end{cases}$$

in which:

$w^\lambda$ is a vector of the space of resemblances to the predetermined set of E reference speakers representing the segment x in this representation space;

$\tilde{p}(x^\lambda|\overline{\lambda}_j)$ is a probability density or probability normalized by a universal model, representing the resemblance of the acoustic representation $x^\lambda$ of a segment of vocal signal of a speaker λ, given a reference speaker $\overline{\lambda}_j$;

$T_x$ is the number of frames or of acoustic vectors of the speech segment x;

$p(x^\lambda|\overline{\lambda}_j)$ is a probability representing the resemblance of the acoustic representation $x^\lambda$ of a segment of vocal signal of a speaker λ, given a reference speaker $\overline{\lambda}_j$;

$p(x^\lambda|\overline{\lambda}_{UBM})$ is a probability representing the resemblance of the acoustic representation $x^\lambda$ of a segment of vocal signal of a speaker λ in the model of the UBM world;

M is the number of Gaussians of the relative GMM model, generally a power of 2 lying between 16 and 1024;

D is the dimension of the acoustic space of the absolute GMM model;

$x^\lambda$ is an acoustic vector of dimension D, i.e. a vector of the cepstral coefficients of a sequence of vocal signal of the speaker λ in the absolute GMM model;

$b_k(x)$ represents, for k=1 to D, Gaussian densities, parameterized by a mean vector $\mu_k$ of dimension D and a covariance matrix $\Sigma_k$ of dimension D×D;

$\alpha_k$ represents, for k=1 to D, the weighting coefficients of the mixture of Gaussians in the absolute GMM model.

On the basis of the representations $W_j$ of the segments of speech $x_j$(j=1, . . . , $N_\lambda$) of the speaker λ, the speaker λ is represented by the Gaussian distribution ψ of parameters $\mu^\lambda$ and $\Sigma_\lambda$ defined by the following relations:

$$\begin{cases} \mu^\lambda = \{\mu_i^\lambda\}_{i=1,\ldots,E} \text{ with } \mu_i^\lambda = \frac{1}{N_\lambda} \sum_{j=1}^{N_\lambda} \tilde{p}(x_j^\lambda | \overline{\lambda}_i) & (8) \\ \sum^\lambda = \{\sum_{ii'}^\lambda\}_{i,i'=1,\ldots,E} \text{ with } \sum_{ii'}^\lambda = \frac{1}{N_\lambda} \sum_{j=1}^{N_\lambda} (\tilde{p}(x_j^\lambda | \overline{\lambda}_i) - \mu_i^\lambda)(\tilde{p}(x_j^\lambda | \overline{\lambda}_{i'}) - \mu_{i'}^\lambda) & (9) \end{cases}$$

in which $\mu_i^\lambda$ represents components of the mean vector $\mu^\lambda$ of dimension E of the resemblances $\psi(\mu^\lambda, \Sigma^\lambda)$ of the speaker $\lambda$ with respect to the E reference speakers, and $\Sigma_{ii}^\lambda$ represents components of the covariance matrix $\Sigma^\lambda$ of dimension E×E of the resemblances $\psi(\mu^\lambda, \Sigma^\lambda)$ of the speaker $\lambda$ with respect to the E reference speakers.

The analysis means 9 are linked by a connection 10 to training means 11 making it possible to calculate the vocal representations, in the form of vectors of dimension D, of the E reference speakers in the GMM model chosen. The training means 11 are linked by a connection 12 to a database 13 comprising vocal signals of a predetermined set of speakers and their associated vocal representations in the reference GMM model. This database may also store the result of the analysis of vocal signals of initial speakers other than said E reference speakers. The database 13 is linked by the connection 14 to the means of analysis 9 and by a connection 15 to the acoustic processing means 7.

The system further comprises a database 16 linked by a connection 17 to the acoustic processing means 7, and by a connection 18 to the analysis means 9. The database 16 comprises audio archives in the form of vocal items, as well as the associated vocal representations in the GMM model chosen. The database 16 is also able to store the associated representations of the audio items calculated by the analysis means 9. The training means 11 are furthermore linked by a connection 19 to the acoustic processing means 7.

An example will now be described of the manner of operation of this system that can operate in real time since the number of parameters used is appreciably reduced with respect to the GMM model, and since many steps may be performed off-line.

The training module 11 will determine the representations in the reference GMM model of the E reference speakers by means of the vocal signals of these E reference speakers stored in the database 13, and of the acoustic processing means 7. This determination is performed according to relations (1) to (3) mentioned above. This set of E reference speakers will represent the new acoustic representation space. These representations of the E reference speakers in the GMM model are stored in memory, for example in the database 13. All this may be performed off-line.

When vocal data are received from a speaker $\lambda$, for example via the mike 1, they are transmitted via the connection 2 to the recording means 3 able to perform the storage of these data in the storage means 5 with the aid of the connection 4. The recording means 3 transmit this recording to the means of acoustic processing 7 via the connection 6. The means of acoustic processing 7 calculate a vocal representation of the speaker in the predetermined GMM model as set forth earlier with reference to the above relations (1) to (3).

Furthermore, the means of acoustic processing 7 have calculated, for example off-line, the vocal representations of a set of S test speakers and of a set of T speakers in the predetermined GMM model. These sets are distinct. These representations are stored in the database 13. The means of analysis 9 calculate, for example off-line, a vocal representation of the S speakers and of the T speakers with respect to the E reference speakers. This representation is a vector representation with respect to these E reference speakers, as described earlier. The means of analysis 9 also perform, for example off-line, a vocal representation of the S speakers and of the T speakers with respect to the E reference speakers, and a vocal representation of the items of the speakers of the audio base. This representation is a vector representation with respect to these E reference speakers.

The processing means 7 transmit the vocal representation of the speaker $\lambda$ in the predetermined GMM model to the means of analysis 9, which calculate a vocal representation of the speaker $\lambda$. This representation is a representation by probability density of the resemblances to the E reference speakers. It is calculated by introducing a priori information by means of the vocal representations of T speakers. Specifically, the use of this a priori information makes it possible to maintain a reliable estimate, even when the number of available speech segments of the speaker $\lambda$ is small. A priori information is introduced by means of the following equations:

$$\begin{cases} \tilde{\mu}^\lambda = \frac{N_0 \mu_0 + N_\lambda \mu^\lambda}{N_0 + N_\lambda} & (10) \\ W = \left(w_1^{\text{spk\_1}} \ldots w_{N_1}^{\text{spk\_1}} \ldots w_1^{\text{spk\_T}} \ldots w_{N_T}^{\text{spk\_T}}\right) & (11) \end{cases}$$

in which:

$\mu^\lambda$: mean vector of dimension E of the resemblances $\psi(\mu^\lambda, \Sigma^\lambda)$ of the speaker $\lambda$ with respect to the E reference speakers;

$N_\lambda$: number of segments of vocal signals of the speaker $\lambda$, represented by $N_\lambda$ vectors of the space of resemblances to the predetermined set of E reference speakers;

W: matrix of all the initial data of a set of T speakers spk_i, for i=1 to T, whose columns are vectors of dimension E representing a segment of vocal signal represented by a vector of the space of resemblances to the predetermined set of E reference speakers, each speaker spk_i having $N_i$ vocal segments, characterized by its mean vector $\mu_0$ of dimension E, and by its covariance matrix $\Sigma_0$ of dimension E×E;

$\tilde{\mu}^\lambda$: mean vector of dimension E of the resemblances $\psi(\tilde{\mu}^\lambda, \tilde{\Sigma}^\lambda)$ of the speaker $\lambda$ with respect to the E reference speakers, with introduction of a priori information; and $\tilde{\Sigma}^\lambda$: covariance matrix of dimension E×E of the resemblances $\psi(\tilde{\mu}^\lambda, \tilde{\Sigma}^\lambda)$ of the speaker $\lambda$ with respect to the E reference speakers with introduction of a priori information.

Moreover, it is possible to take a single covariance matrix for each speaker, thereby making it possible to orthogonalize said matrix off-line, and the calculations of probability densities will then be performed with diagonal covariance matrices. In this case, this single covariance matrix is defined according to the relations:

$$\begin{cases} \sum_{ii'}^{\sim} = \frac{1}{N_0} \sum_{s=1}^{T} \sum_{j \in I_\delta} (W_{ij} - \overline{W}_{is})(W_{i'j} - \overline{W}_{i's}) & (12) \\ \overline{W}_{is} = \frac{1}{N_T} \sum_{j \in I_\delta} W_{ij} & (13) \end{cases}$$

in which

W is a matrix of all the initial data of a set of T speakers spk_i, for i=1 to T, whose columns are vectors of dimension E representing a segment of vocal signal represented by a vector of the space of resemblances to the predetermined set of E reference speakers, each speaker spk_i having $N_i$ vocal segments, characterized by its mean vector $\mu_0$ of dimension E, and by its covariance matrix $\Sigma_0$ of dimension E×E.

Next, the analysis means 9 will compare the vocal representations of the request and of the items of the base by identification and/or verification tests of the speakers. The speaker identification test consists in evaluating a measure of likelihood between the vector of the test segment $w_x$ and the set of representations of the items of the audio base. The speaker identified corresponds to the one which gives a maximum likelihood score, i.e.

$$\tilde{\lambda} = \underset{\lambda}{\mathrm{argmax}}\, p\left(w_x \mid \tilde{\mu}^\lambda, \sum\nolimits^\lambda\right) \quad (14)$$

from among the set of S speakers.

The speaker verification test consists in calculating a score of likelihood between the vector of the test segment $w_x$ and the set of representations of the items of the audio base, normalized by its score of likelihood with the representation of the a priori information. The segment is authenticated if the score exceeds a predetermined given threshold, said score being given by the following relation:

$$\mathrm{score} = \frac{p\left(w_x \mid \tilde{\mu}^\lambda, \sum\nolimits^\lambda\right)}{p(w_x \mid \mu_0, \Sigma_0)} \quad (15)$$

Each time the speaker $\lambda$ is recognized in an item of the base, this item is indexed by means of information making it possible to ascertain that the speaker $\lambda$ is talking in this audio item.

This invention can also be applied to other uses, such as the recognition or the identification of a speaker.

This compact representation of a speaker makes it possible to drastically reduce the calculation cost, since there are many fewer elementary operations in view of the drastic reduction in the number of parameters required for the representation of a speaker.

For example, for a request of 4 seconds of speech of a speaker, that is to say 250 frames, for a GMM model of dimension 27, with 16 Gaussians the number of elementary operations is reduced by a factor of 540, thereby enormously reducing the calculation time. Furthermore, the size of memory used to store the representations of the speakers is appreciably reduced.

The invention therefore makes it possible to analyze vocal signals of a speaker while drastically reducing the time for calculation and the memory size for storing the vocal representations of the speakers.

What is claimed is:

1. A method of analyzing vocal signals of a speaker, comprising:
    transforming a vocalized audio signal of the speaker from an audio input device into a numerical representation and storing it in a memory of a device;
    using a probability density representing resemblances between a vocal representation of the speaker in a predetermined model and a predetermined set of vocal representations of a number E of reference speakers that do not include the speaker in said predetermined model, said predetermined model being an absolute model of dimension D, using a mixture of M Gaussians, in which the speaker is represented by a set of parameters comprising weighting coefficients for the mixture of Gaussians in said absolute model, mean vectors of dimension D and covariance matrices of dimension D×D and wherein the probability density of the resemblances between the representation of said vocal signals of the speaker and the predetermined set of vocal representations of the reference speakers is represented by a Gaussian distribution of mean vector of dimension E and of covariance matrix of dimension E×E, said mean vector and covariance matrix being estimated in a space of resemblances to the predetermined set of E reference speakers;
    analyzing the probability density to deduce therefrom information on the vocal signals; and
    providing an analysis result from a device and applying the result to an application relating to the acoustic vocal signal of the speaker.

2. The method of claim 1, wherein the application is an indexing of audio documents.

3. The method of claim 1, wherein the application is an identification of a speaker.

4. The method of claim 1, wherein the application is a verification of a speaker.

5. The method of claim 1, wherein there are $N_\lambda$ segments of vocal signals for the speaker, represented by $N_\lambda$ vectors of the space of resemblances with speaker with respect to the E reference speakers is defined as a function of a mean vector of dimension E and of a covariance matrix of the resemblances of the speaker with respect to the E reference speakers.

6. The method of claim 5, further comprising:
    introducing a priori information into the probability densities of the resemblances with respect to the E reference speakers.

7. The method of claim 6, wherein the covariance matrix of the speaker is independent of said speaker.

8. A system for the analysis of vocal signals of a speaker, comprising:
    a processor and a memory;
    databases within the memory for storing vocal signals of a predetermined set of speakers and vocal representations associated therewith in a predetermined model by mixing of Gaussians, as well as databases of audio archives;
    said predetermined model being an absolute model of dimension D, using a mixture of M Gaussians, in which the speaker is represented by a set of parameters comprising weighting coefficients for the mixture of Gaussians in said absolute model, mean vectors of dimension D and covariance matrices of dimension D×D and wherein the probability density of the resemblances between the representation of said vocal signals of the speaker and the predetermined set of vocal representations of the reference speakers is represented by a Gaussian distribution of mean vector of dimension E and of covariance matrix of dimension E×E, said mean vector and covariance matrix being estimated in a space of resemblances to the predetermined set of E reference speakers; and a device with the processor implementing calculating routines for analyzing the vocal signals using a vector representation of the resemblances between the vocal representation of the speaker and a predetermined set of vocal representations of E reference speakers that do not include the speaker, the device producing an analysis result that is provided to an application relating to the acoustic vocal signal of the speaker.

9. The system of claim 8, the databases further storing parameters of the vocal signals analysis performed by said means for analyzing.

* * * * *